United States Patent
Vining

(10) Patent No.: US 7,200,782 B2
(45) Date of Patent: Apr. 3, 2007

(54) CLOCK RECOVERY SYSTEM FOR ENCODED SERIAL DATA WITH SIMPLIFIED LOGIC AND JITTER TOLERANCE

(75) Inventor: Suzanne Mary Vining, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 390 days.

(21) Appl. No.: 10/692,103

(22) Filed: Oct. 23, 2003

(65) Prior Publication Data

US 2005/0091559 A1    Apr. 28, 2005

(51) Int. Cl.
*G06K 5/04*    (2006.01)
(52) U.S. Cl. .................... 714/700; 714/34; 714/741; 714/798; 365/226; 365/375
(58) Field of Classification Search ................ 714/799, 714/798, 700; 365/226, 375
See application file for complete search history.

(56) References Cited

U.S. PATENT DOCUMENTS

| 5,239,561 | A |   | 8/1993  | Wong et al. |
| 5,276,712 | A | * | 1/1994  | Pearson ..................... 375/360 |
| 5,329,559 | A |   | 7/1994  | Wong et al. |
| 5,671,258 | A | * | 9/1997  | Burns et al. ................. 375/359 |
| 6,052,248 | A |   | 4/2000  | Reed et al. |
| 6,337,590 | B1| * | 1/2002  | Millar ......................... 327/158 |
| 6,529,148 | B1| * | 3/2003  | Maddux ...................... 341/100 |
| 6,545,507 | B1|   | 4/2003  | Goller |
| 6,760,389 | B1| * | 7/2004  | Mukherjee et al. ......... 375/326 |
| 6,981,168 | B2| * | 12/2005 | Schmatz et al. ............ 713/500 |

* cited by examiner

*Primary Examiner*—Albert Decady
*Assistant Examiner*—Esaw T. Abraham
(74) *Attorney, Agent, or Firm*—J. Dennis Moore; W. James Brady; Frederick J. Telecky, Jr.

(57) ABSTRACT

The present invention facilitates clock and data recovery for serial data streams by selecting a clock phase for each input data transition and generating a recovered clock. In order to identify data transitions, the received serial data stream is sampled N times per ideal bit time, where the minimum value for N must be greater than $2/(1-(2*\text{jitter\_ratio}))$ and jitter_ratio is the fractional representation of the portion of the ideal bit time during which transitions can be expected or estimated to occur. On identifying a transition, a toggle phase is set. In order to avoid stale clock phase selection resulting from jitter and the like, one phase after the toggle phase is blocked or prevented from being selected for the clock. Finally, a clock phase is selected N/2 phases from the toggle phase and a recovered clock is generated by combining the individually selected clock phases.

23 Claims, 7 Drawing Sheets

CLOCK RECOVERY SYSTEM FOR ENCODED SERIAL DATA WITH SIMPLIFIED LOGIC AND JITTER TOLERANCE

FIELD OF THE INVENTION

The present invention relates generally to the high speed encoded data, and more particularly, to systems and methods that recover clock information from encoded serial data with simplified logic and improved jitter tolerance.

BACKGROUND OF THE INVENTION

With the increased speed of computers and the need for high performance peripherals, the use of high speed serial data communications applications in integrated circuits built to physically interface to any given bus has also increased.

USB (Universal Serial Bus) 1.1 has been the de facto external connectivity standard between computers and their peripherals in serial communications up to 12 Mbps (Million bits per second). As the need for faster communications and higher performance peripherals has grown, computer and peripheral manufacturers have responded with a new higher speed standard: USB 2.0.

USB 2.0 increases the device data throughput up to 480 Mbps, 40 times faster than USB 1.1 devices while maintaining or improving on other USB 1.1 specifications such as the Microsoft Plug and Play feature, and numerous other technical specifications, some of which will be discussed in relation to the present invention. USB 2.0 even challenges FireWire (IEEE 1394) currently at 400 Mbps, as the serial interface of the future. Three speed modes are available under the new USB 2.0 standard: high-speed (480 Mbps), full-speed (12 Mbps), and low-speed (1.5 Mbps).

Conventionally, an incoming serial data stream may be NRZI (Non-Return-to-Zero Inverted) encoded and bit stuffed. NRZI is a data transmission method in which the polarity of the bit is reversed whenever a 0 bit is encountered, and a static voltage level is transmitted whenever a 1 bit is encountered as illustrated in FIG. 1, and designated at reference numeral 110. NRZI thus uses the presence or absence of a transition to signify a bit (indicating a logical 0 by inverting the state). Combined with bit-stuffing, where an extra 0 bit is inserted after every six consecutive 1 bits, this data encoding causes a guaranteed transition every 7 bit times when a data payload would be all 1 bits. Every transition gives the CDR circuit phase information that it uses to align its recovered clock to the phase of the incoming data. The less time between transitions, the less phase error which is to be expected caused by frequency offset. Other techniques used are, for example, 8b–10b coding similar to 1394, PCI express, and Ethernet.

The structure of the data stream follows a specific communications protocol, which defines the rules for sending a block of data (each known as a Protocol Data Unit (PDU)) (e.g., 150 of FIG. 2) from one node in a network to another node. The exchanged PDUs comprises three parts: a sync sequence 160, a packet payload (also known as a Service Data Unit (SDU)) 170, and an End of Packet (EOP) 180. The protocol does not define or constrain the data carried in the payload portion 170 of the data block. The protocol does, however, specify the format of the sync sequence.

Packet switching refers to protocols in which a longer message (the data) exceeding a network-defined maximum length is divided into short message packets before they are transmitted. Each packet, with an associated header with information for routing the packet from origination to destination, is then transmitted individually and can even follow different routes to its destination. Once all the packets forming a message arrive at the destination, they are recompiled into the original message. Most modern Wide Area Network (WAN) protocols, including the successful TCP/IP protocol, as well as X.25, and Frame Relay, are based on packet-switching technologies.

A fundamental difference between packet communication and conventional, continuous-type communication is that the data is formed into packets as described above. When there is no data to be sent, the bus is put into an idle state that shows no change in voltage levels. Continuous-type protocols would fill the idle time within a frame with well-known "idle" patterns which are used to occupy the link when there is no data to be communicated. A packet network equipment discards the "idle" patterns between packets and processes the entire packet as one piece of data. The equipment examines the packet header information (PCI) and then either removes the header (in an end system) or forwards the packet to another system. If the out-going link is not available, then the packet is placed in a queue until the link becomes free. A packet network is formed by links which connect packet network equipment.

In the packet switching used in USB 2.0 at 480 Mbps, one portion of the packet header 160 will contain at least 12 sync bits indicated by an alternating pattern, intended to allow the sending and receiving clocks time to synchronize. The packet payload 170 will contain up to 1024 bytes, while the end-of-packet 180 contains 8 bits.

The incoming data stream may be at a different frequency than the receiving system. Each side can vary from an ideal frequency within a +/−delta range as limited by a ppm tolerance value defined in a respective industry standard. Often, the source and receive frequencies are different. Regardless of the relative source and destination frequencies, the incoming data stream shows all jitter components of an electrical transmission over a bandwidth limited media (e.g., data dependant cycle to cycle jitter).

A linear clock and data recovery (CDR) circuit attempts to recover the original transmitting clock and data. A conventional CDR circuit attempts to recover the clock and data by utilizing a phase detector (PD) or alternatively a phase-frequency detector (PFD), and source a charge pump followed by a VCO of an analog PLL. A received data stream is sampled at a number of phases. Generally, a toggle phase and clock phase are selected for each bit time according to the sampled phases. The sampled data is then analyzed and extracted with the selected clock and toggle phases to recover the transmitted data. However, complex logic is required to determine appropriate sample and clock phases as well as obtaining the data. Additionally, the logic can incorrectly select the wrong sample and clock phases, typically as a result of jitter.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates serial data communication by recovering clock information from encoded serial data. The clock information is obtained without employing complex logic circuits and muxes by utilizing inherent properties of the NRZI encoding scheme. Additionally, the present invention is operable to obtain the clock information with relatively high jitter tolerance.

In order to recover the clock phase, the received serial data stream is analyzed to identify transition(s). Upon identifying the transition(s), a toggle phase is selected. In order to avoid an erroneous selection resulting from jitter and the like, one phase after the toggle phase is blocked or prevented from being selected in one aspect of the invention. In other aspects, multiple phases after the toggle phase are blocked. Finally, a clock phase is selected according to the toggle phase and a select clock is generated.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates clock and data recovery for serial data streams by recovering a clock phase and generating a recovered clock. In order to recover the clock phase, the received NRZI serial data stream is analyzed to identify transition(s). Upon identifying the transition(s), a toggle phase is selected. In order to avoid an erroneous selection resulting from jitter and the like, one phase after the toggle phase is blocked or prevented from being selected, in one aspect. Finally, a clock phase is selected according to the toggle phase and a select clock is generated.

Figure 1:
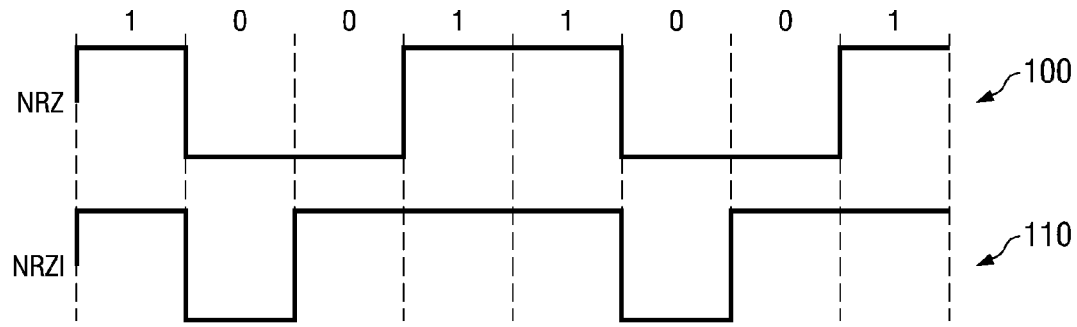
FIG. 1 is a diagram illustrating an example of NRZ and NRZI data encoding.
Figure 2:
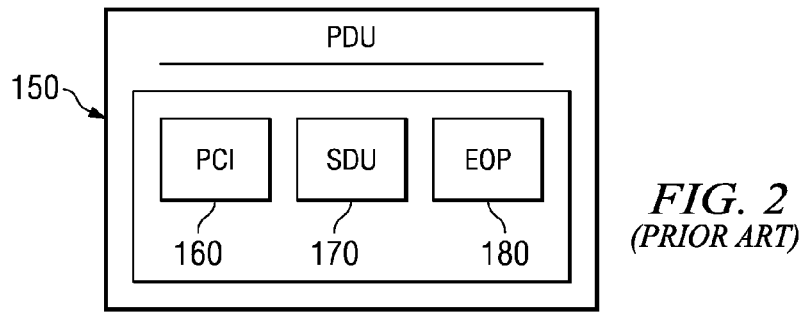
FIG. 2 is a diagram illustrating an exemplary structure of a data stream.
Figure 3:
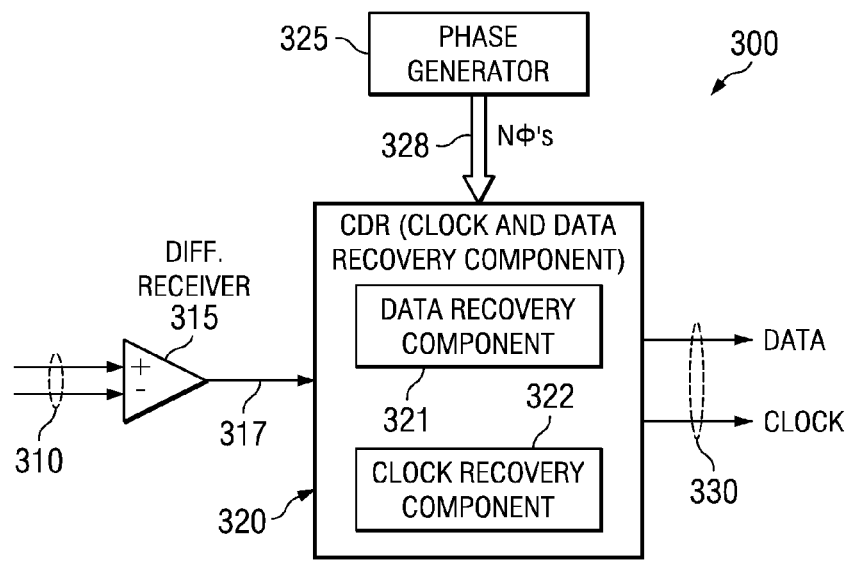
FIG. 3 is a diagram illustrating an exemplary clock data recovery system in accordance with an aspect of the present invention.

FIG. 3 illustrates an exemplary CDR system 300, in which several aspects of the current invention may be accomplished. A received serial data stream 310 enters a differential receiver (e.g., or transceiver) 315 and outputs a single ended received serial data stream 317 into a CDR circuit 320. A phase generator 325 generates a local clock signal running at approximately the same frequency as a transmitter clock utilized to initially generate the received serial data stream 310. The phase generator 325 produces N phases 328 of the clock signal which are supplied to the CDR circuit 320.

The number of phases (N) generated and supplied by the phase generator 325 is implementation dependent and depends upon a number of factors (e.g., jitter, bit time/period, and the like). The N phases are successively offset by $(1/N) \times bit$ time so as to provide evenly spaced phases throughout the time period/bit time. As an example, assume 8 phases were sufficient for USB 2.0, which has a bit time or time period of 2.08333 ns (1/480 MHz). As a result, the 8 phases could be successively offset by $(1/8) \times 2.08333$ ns. The N clock phases 328 of the example, together with the single ended data stream 317 are input to the CDR circuit 320 which is operable to obtain a recovered clock and recovered data 330.

A data recovery component 321 detects data stream transition(s) and obtains recovered data from the data stream transition(s). A clock recovery component 322 is operable to recover one or more clocks associated with the recovered data. Unlike conventional CDR circuits, the CDR circuit 320 does not require data phase detection and/or selection in order to obtain the recovered data. Although the data recovery component 321 and the clock recovery component 322 are illustrated separately in FIG. 3, these components can share common components and circuits, such as for identifying transitions/data toggles.

The clock recovery component 322 also employs data transitions to identify a toggle phase and select a clock phase. It can robustly recover the clock for any legitimate jitter by selecting the number of sampling phases, N, using an algorithm dependent on the jitter value, positioning the selected clock phase so as to clock each bit once and only once, blocking stale clock phase selections and generally ensuring that no clock pulses are lost due to gate delays. The important consideration for determining the number of sample phases is that the sampled data timing is distorted from the received serial data stream by the length of the sample phase period. Too much distortion makes the data unrecoverable. Note that legitimate jitter is within a range such that, even after sampling, every single bit is greater than 50% and less than 150% of the ideal bit time.

In contrast, some conventional approaches only account for jitter within 1 or 2 phases from a transition and, therefore, fail to check for erroneous phase selection outside of that range. Even if they respond to jitter over more than 2 phases, they may have insufficient number of samples, thus increasing the sample error margin to a point which prevents proper delineation between bits. Additionally, conventional approaches can require a relatively large amount of complex combinational gating to do phase selection.

Figure 4:
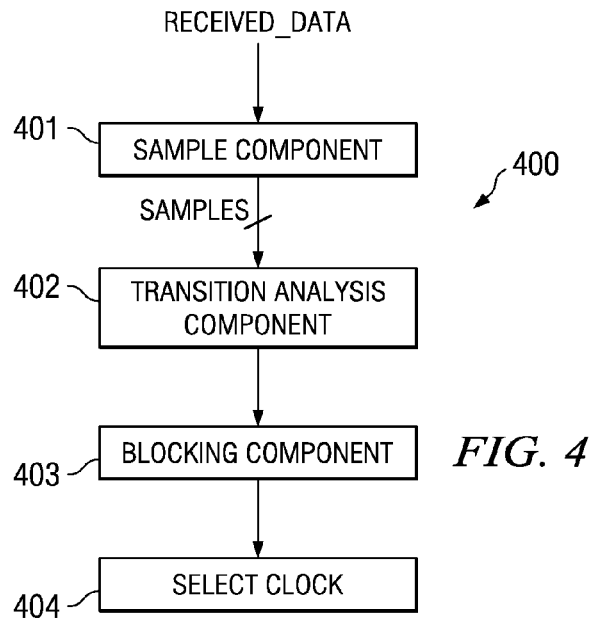
FIG. 4 is a block diagram illustrating a clock recovery component in accordance with an aspect of the present invention.

FIG. 4 is a block diagram illustrating a clock recovery component 400 (similar to component 322 in FIG. 3) in accordance with an aspect of the present invention. The clock recovery component 400 is described at a high level to illustrate certain aspects of the invention. A more detailed discussion of an exemplary implementation is provided infra.

The clock recovery component 400 operates on a received NRZI serial data stream to obtain a recovered serial data stream. The clock recovery component 400 is operable to obtain a recovered clock from the received serial data and avoid some errors caused by jitter. The clock recovery component 400 employs the encoding of NRZI to select a sample phase and a corresponding clock phase (typically N/2 later). It is appreciated that variations of the NRZI encoding can be employed, such as where the occurrence of a transition indicates a logical 1 and the non-occurrence thereof indicates a logical 0, and be in accordance with the present invention.

The clock recovery component 400 comprises a sample component 401, a transition analysis component 402, a blocking component 403, and a select clock component. The sample component 401 is operable to receive a serial data stream that has been encoded with NRZI encoding and generate N samples of the serial data stream. The sample component 401 obtains the N samples, substantially evenly spaced, through N phases of a bit time. Flip-flops and/or other sampling devices can be employed to physically sample the data. A separate clock/phase generation component can be employed to generate the N phases. Successive sets of N samples are generated for subsequent bit times by the sampling component 401.

The transition analysis component 402 receives the N samples from the sample component 401 and performs a 2-stage analysis. The first determines whether a transition has occurred per each sample phase during the associated bit time. The first stage output can also be referred to as data toggle history. The second is a result indicating whether a transition has or has not occurred over a bit time and is generated according to those determinations. The transition analysis component 402 analyzes consecutive sampled data phases to identify a low to high or high to low transition. Upon identifying one or more transitions, the transition analysis component 402 generates a result from stage 2 indicating that a transition has occurred (e.g., high). Otherwise, the transition analysis component 402 generates a stage 2 result indicating that a transition has not occurred (e.g., low). This result can also be referred to as decoded data. Note that the result is also the complement of the original data that was encoded where a transition indicates a zero and a non-transition indicates a one. A stage 2 result is generated for each bit time.

The blocking component 403 receives the stage 1 results from the transition analysis component and uses each of them to block a single stale clock phase selection possible for that toggle. Each clock phase selection is associated with an identified transition. The select clock component 404 then selects an appropriate clock phase, which should fall between the shortest and longest jittered bit times. N/2 phases after the phase on which the transition was detected by the transition analysis component 402 will typically accomplish this, but other values are possible. The clock component may optionally shorten the high pulse if the duty cycle needs to be altered and the phase generator component 325 has not already done so.

Figure 5:
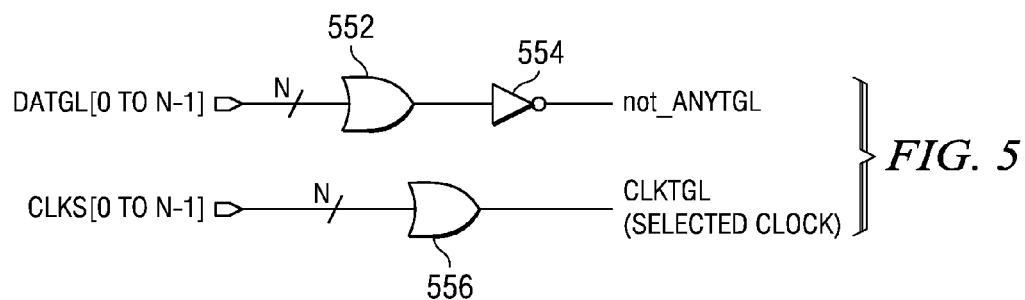
FIG. 5 is a circuit diagram of a portion of a clock recovery component in accordance with an aspect of the present invention.
Figure 6:
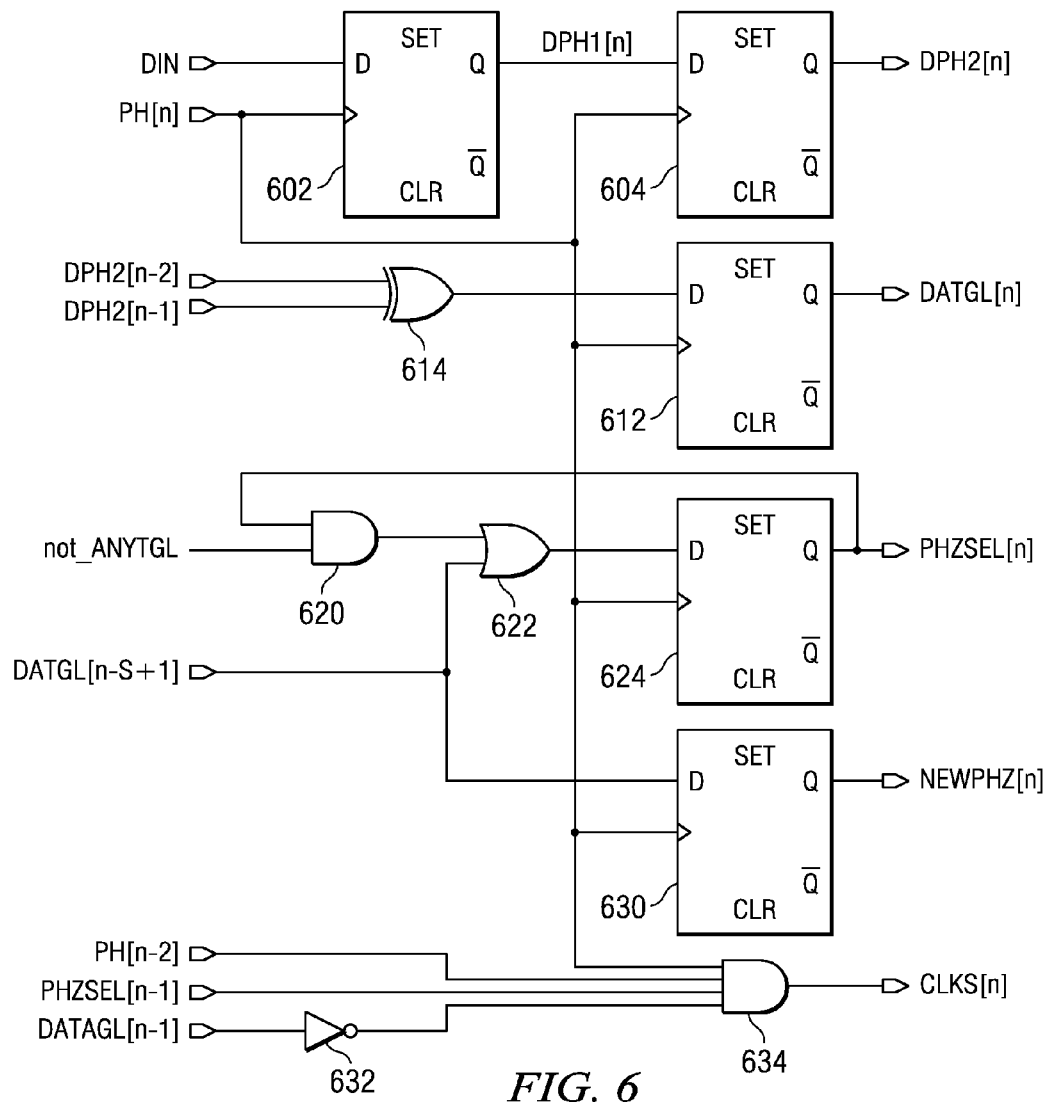
FIG. 6 is a circuit diagram of a portion of the clock recovery component in accordance with an aspect of the present invention.

FIGS. 5 and 6 are diagrams illustrating an exemplary clock recovery component (similar to the clock recovery component 322 of FIG. 3) in accordance with an aspect of the present invention. The clock recovery component operates on a received serial data stream to obtain recovered clock information.

In performing clock recovery, the clock recovery component analyzes the received serial data stream to identify and/or select a clock phase and frequency. Generally, the frequency is known or assumed to be within an acceptable range of similar frequencies (e.g., an ideal frequency +/−an offset amount). However, the clock phase is typically unknown.

In order to recover the clock phase, the received serial data stream is analyzed to identify transitions therewith. From these identified transitions, a clock phase can be selected. Unfortunately, the received serial data stream can contain noise and jitter problems that complicate the selection. Generally, jitter is defined as the short-term variations of a digital signal's significant instants from their ideal positions in time. In theory, the duration between toggles for X bits must be greater than (X−0.5) times the ideal bit time and less than (X+0.5) times the ideal bit time for the data to be recoverable. Accordingly, jitter can cause transitions to happen earlier or later than an ideal bit time.

Jitter can cause inappropriate phase selections. For example, jitter can result in a succeeding transition to end a bit time being later than ideal such that the previously selected clock phase pulses twice during what is actually a single bit. The other possibility is that a succeeding transition to end a bit time is earlier than ideal and the selected clock phase does not pulse at all during that bit time.

The clock recovery component samples the received serial data stream at N phases during each bit time or time period. Consecutive samples are analyzed to identify data transitions, also referred to as data toggles. The clock recovery component selects a proper sample phase relative to a data toggle thereby recognizing relatively short bits of information (short bit times) while also recognizing relatively long bits of information (long bit times) properly as a single bit. As a result, the selected sample phase should be placed between those two relative times (short and long) in terms of selected phases by selecting a clock phase N/2 phases after the phase on which the data toggle was detected. When substantial jitter is present, a previously selected phase can corrupt a newly selected phase. In order to mitigate this corruption, each time a toggle (transition) is detected, the single phase that could possibly interfere is automatically blocked using the new data toggle itself. That single phase interference happens only when the new transition occurs a single phase prior to X and ½ bit times following the previous transition where X is an integer valued at one or greater. If the transition is earlier within the bit time, then the newly selected clock phase precedes the stale phases and when the transition is later the stale phases are deselected before they can interfere. The greater the jitter, the shorter the time may be between selected clock phases. For the 40% jitter example, using N=12 samples, rather than the minimum 11, the fewest number of phases between selected clock phases is 7. If each phase has a 50-50 duty cycle and the recovered clock is generated by an OR function of the selected clock phases, the low pulse for the clock would be only a single phase and could be swallowed due to gate delays. To avoid pulse loss, the duty cycle can be changed. For this example OR implementation, the high pulse is shortened such as to create a 40-60 duty cycle. Either the circuit which generates the phases, component 325, can alter the duty cycle of all the phases or they can be shortened digitally by gating each phase with some prior phase. For a digital solution which shortens the high pulse by 2 phases and with N=12, the shortest clock will have 4 high and 3 low phases.

The minimum number of phases employed (N) depends on jitter. For proper clock recovery, an estimated or expected jitter time added to the period between consecutive sample phases must be less than 50% of the bit time. The equation or algorithm to meet this requirement is:

$$N>2/(1-(2*jitter\_ratio))$$

Jitter ratio is jitter rate expressed as a fraction. For example, if the jitter rate is 40%, then the sample period (bit rate divided by N) must be less than 10% of the bit time and the number of phases should be greater than $10=2/(1-(2*0.4))$. Jitter rate is the percent of the bit time during which all transitions are expected or estimated to occur.

Turning now to FIG. 5, a circuit diagram of a portion 500 of the clock recovery component in accordance with an aspect of the present invention is provided. This portion 500 generates a not any toggle (not_ANYTGL) signal and a selected clock (CLKTGL).

The not any toggle indicates whether a toggle has or has not occurred in a bit time. Thus, an OR component 552 performs a logical OR operation on all the N data toggles of a current bit time (DATGL[0 to N−1]). If one or more data toggles have occurred, the OR component 552 generates a "1" or high value whereas if no data toggles have occurred in the current bit time, the OR component 552 generates a "0" or low value. An inverter 554 inverts the output of the OR component 552 so that the not any toggle signal is "1" or high when no toggles have occurred in the current bit time but is "0" or low when one or more data toggles have occurred.

A clock OR component 556 receives and performs a logical OR operation on a number (N) of clock signals (CLKS[0 to N−1]) from N single phase portions of the clock recovery component. The clock signals are generated by N single phase portions of the clock recovery component and are described in further detail below with respect to FIG. 6. The clock OR component 556 then generates the selected clock as a result. Generally, the selected clock has only one phase present. In other words, all but one of the clock signals should remain low or "0" during the current bit time.

FIG. 6 is a circuit diagram of a portion 600 of the clock recovery component in accordance with an aspect of the present invention. The illustrated portion 600 illustrates processing of a single phase (phase n of 0 to N−1 phases) of N phases. As a result, the portion 600 is sequentially repeated N times for other phases.

A first sample register 602 (e.g., a flip flop component) receives the received NRZI serial data stream (DIN) and is clocked on a current phase (PH[n]) of N phases. The phases are typically generated by a suitable phase generation component such as a delay lock loop (DLL) or phase lock loop (PLL) component. Generally, the N phases are evenly spaced and are each provided to sample registers of the respective single phase portions of the clock recovery component. The first sample register 602 generates a first data sample (DPH1[n]), which is then received by a second sample register 604 that is also clocked on the current phase. As a result, the second sample register 604 generates a second data sample (DPH2[n]), which is a delayed version (by one time period) of the first data sample, and thus operates to mitigate potential metastability problems. It is appreciated that alternate aspects of the present invention include a single sample register or another suitable number of sample registers for this phase.

An XOR component 614 receives two previous consecutive data samples (DPH2[n−2] and DHP2[n−1] and performs an exclusive-OR operation on the samples to generate an output. This output is fed to a data toggle register 612 that generates a data toggle signal (DATGL[n]) and is clocked on the current phase (PH[n]), where the data toggle signal generated is "1" or high when a transition is detected between the two data samples and is "0" or low when a transition is not detected. It is noted that NRZI employs transitions for encoding and is not generally concerned with signal values. Thus, whether a low-to-high or high-to-low transition occurs is not generally of substantial importance for NRZI encoding. The fact that a transition occurs is important (e.g., typically, a transition indicates a value of 0 for the current bit time whereas absence of a transition indicates a value of 1 for the current bit time).

An AND component 620 is configured to receive the not any toggle (not_ANYTGL) signal and a previous phase select generated at a previous bit time. The not any toggle signal causes the clock phase selected during a previous bit time to be the current selected clock phase by maintaining the previous selection. The output of the AND component 620 is received by OR component 622, along with a previous phase data toggle (DATGL[n−S+1]) of the n−S+1 phase, where S=N/2. As an example, if N=12 and n−6, the previous data toggle is from phase 2. The OR component 622 generates a logical or of its inputs and provides this output to a phase select register 624. This register 624, clocked at the current phase (PH[n]) generates a current phase select (PHZSEL[n]) from the output of the OR component 622. As a result, the current phase select is "1" or high is there is not a transition in the current bit time and this phase was selected in a previous bit time or if a previous phase data toggle (n−S+1) is high. A new phase register 630 is clocked on the current phase (PH[n]) and also receives the previous data toggle (DATGL[n−S+1]). The new phase register 630 generates a new phase signal (NEWPHZ[n]) that is essentially a phase delayed version of the previous data toggle.

A clock AND component 634 generates a clock signal (CLKS[n]) for the current phase. The AND component 634 receives the current phase (PH[n]), a previous phase clock (PH[n−2]), a previous phase select (PHZSEL[n−1]), and an inverted previous data toggle signal (DATGL[n−1]). The previous data toggle signal is inverted by an inverter 632 such that if the data toggle signal was set or high for the previous phase (n−1), the clock signal is automatically low. The clock signal, along with clock signals for the other phases are provided to the clock OR component 556, described supra.

Figure 7:
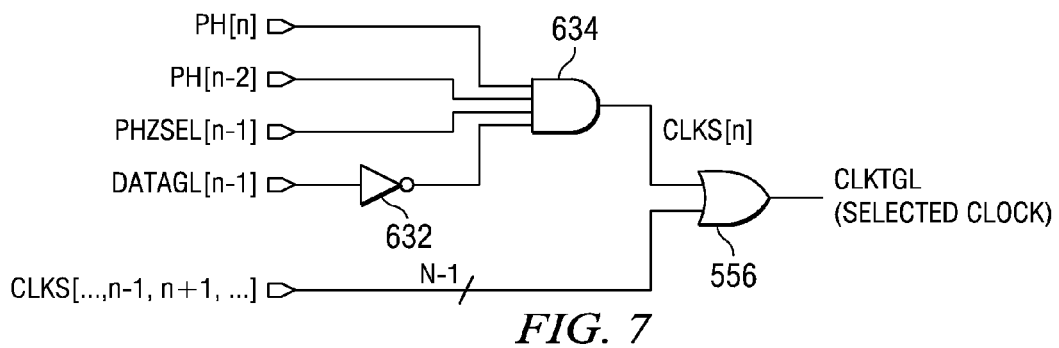
FIG. 7 is a circuit diagram of a portion of the clock recovery component illustrating clock selection from multiple phase circuits in accordance with an aspect of the present invention.

FIG. 7 is a circuit diagram illustrating a portion of the clock recovery component illustrating clock selection from multiple phases in accordance with an aspect of the present invention. Here, the clock signal for the current phase (CLKS[n]) is combined by the OR component 556 of FIG. 5 with clock signals for other phases within a single bit time to obtain the selected clock (CLKTGL). The current clock phase is generated as described supra with respect to FIG. 6. The other phases are generated in a similar fashion.

Figure 8:
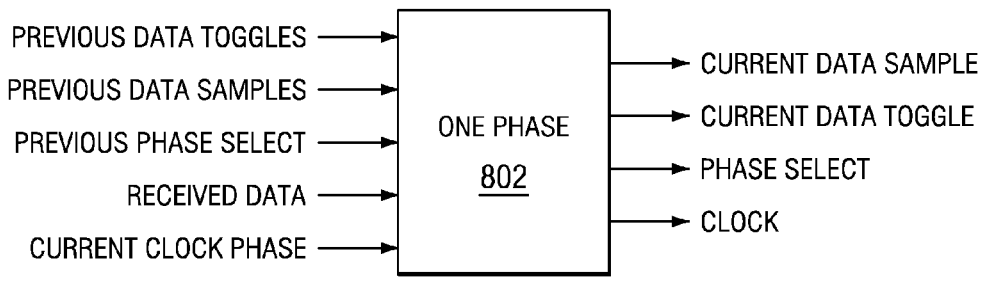
FIG. 8 is a block diagram illustrating a one phase circuit in accordance with an aspect of the present invention.

FIG. 8 is a block diagram illustrating inputs received by and outputs generated by a one phase circuit 802 of a clock recovery component. A more detailed description of its internal operation is provided supra with respect to FIGS. 6 and 7. The one phase circuit 802 generally operates according to a clock set to a current phase (n).

The one phase circuit 802 receives previous data samples, a previous phase select, previous data toggles, received data and current clock phase. The circuit 802 can receive other information/signals such as a previous clock phase or further data sample and toggle history possibly for glitch identification and handling. The previous data samples are the two prior, consecutive data samples (e.g., DPH2[n−2] and DPH2[n−1] of FIGS. 6 and 7). The previous phase select is the phase select of the previous bit time. The previous data toggles are from the preceding phase and some other prior phase or phases up through S−1 earlier. The received data is the received NRZI-encoded serial data stream. If needed, the previous clock phase is used to alter the duty cycle.

The one phase circuit 802 generates a current data sample, a current data toggle, a phase select, and a clock signal. The current data sample is obtained by sampling a received serial data stream at a current phase (n). The current data toggle is a result of the previous two data samples and indicates whether or not a transition occurred between them. The phase select indicates whether the next phase should or should not be selected. The clock signal is generated and combined with clock signals from other phase circuits to obtain a selected clock.

Figure 9:
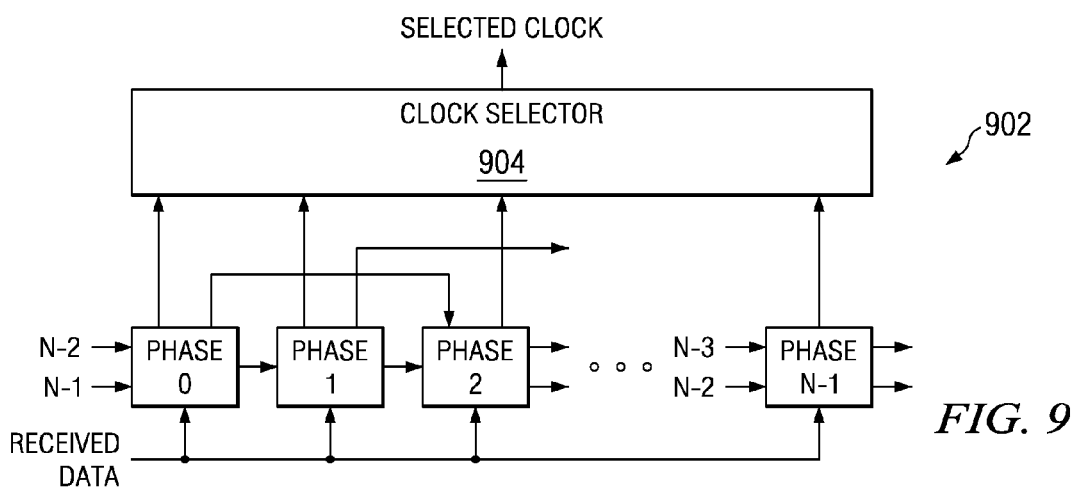
FIG. 9 is a block diagram illustrating a clock recovery in accordance with an aspect of the present invention.

FIG. 9 is a block diagram illustrating a clock recovery component in accordance with an aspect of the present invention. The clock recovery component is operable to obtain a selected clock from a received serial data stream with relatively simple logic.

A number of phase processing circuits 902 obtain the received serial data stream. N phase processing circuits are employed wherein N is the number of phases or data samples obtained per time period. Operation of the individual circuits is omitted for brevity, but is described in detail supra. Each of the circuits 902 operates on a separate phase clock to obtain data samples, detect data toggles, and generate a clock. It can be seen that each of the circuits provide data samples, phase selects, and data toggle history to successive circuits. A clock selector 904 receives the clocks generated by the phase processing circuits and generates one or more selected clocks. The selected clock(s) can be combined with data recovered by a data recovery component to provide a complete output for a clock and data recover component as shown in FIG. 3.

Figure 10:
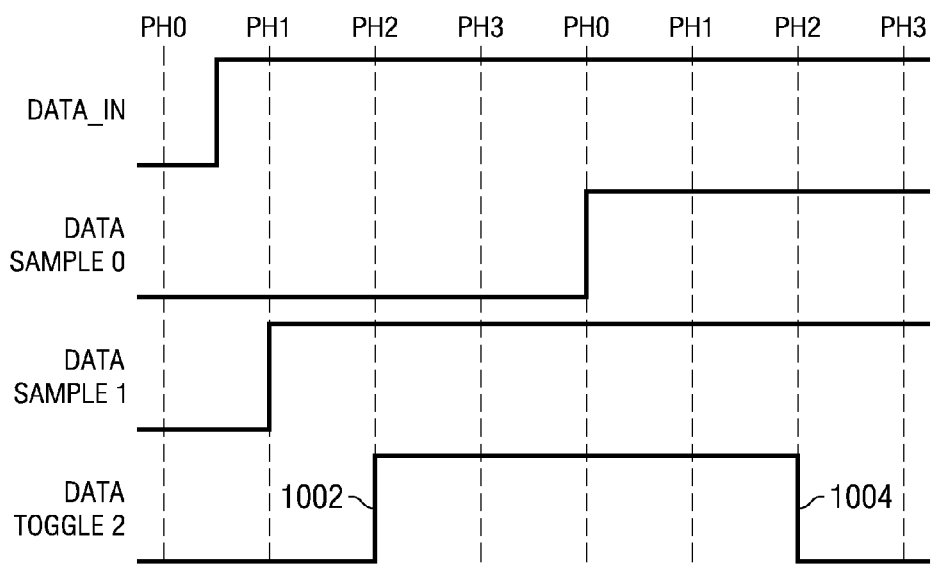
FIG. 10 is an exemplary timing diagram illustrating a clock recovery device in accordance with an aspect of the present invention.

Beginning with FIG. 10, an exemplary timing diagram for a clock recovery device in accordance with an aspect of the present invention is provided. FIG. 10 illustrates consecutive data samples along with an associated data toggle. For ease of illustration, the number of phases and samples employed is 4 in this example. However, the present invention can employ any suitable number of phases and data samples.

A first data sample (0) and a second data sample (1) are shown on the timing diagram. A data toggle (2) is also shown and is an XOR of the first and second data samples. Accordingly, at 1002, the data toggle becomes high indicating that a transition has occurred between the first data sample and the second data sample. Here, the first data sample is low whereas the second data sample is high. At a bit time later 1004, the data toggle becomes low because the first data sample and the second data sample are now both high.

Figure 11:
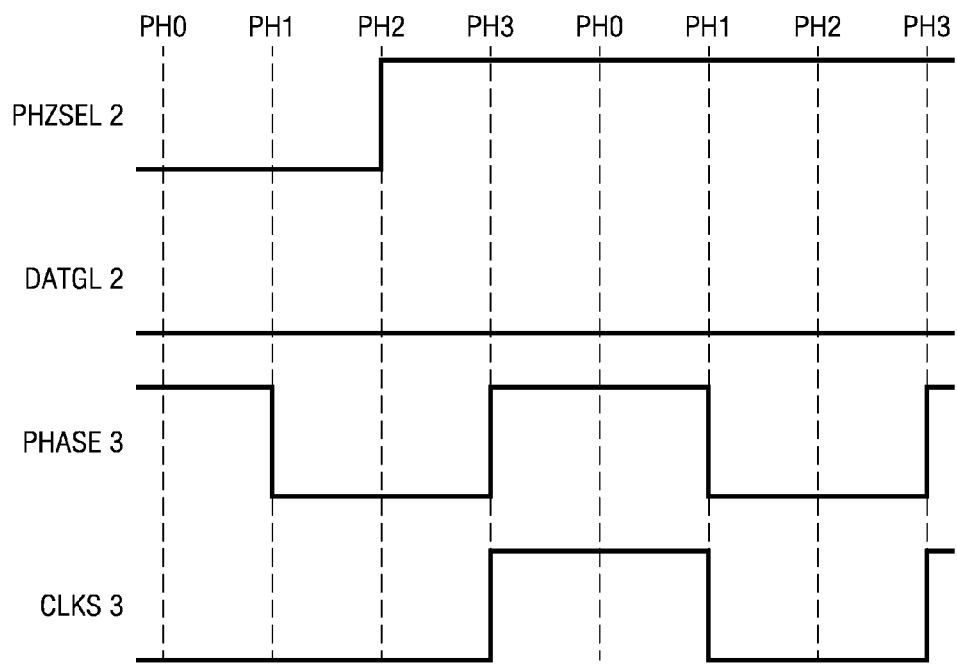
FIG. 11 is an exemplary timing diagram illustrating a clock recovery device in accordance with an aspect of the present invention.
Figure 12:
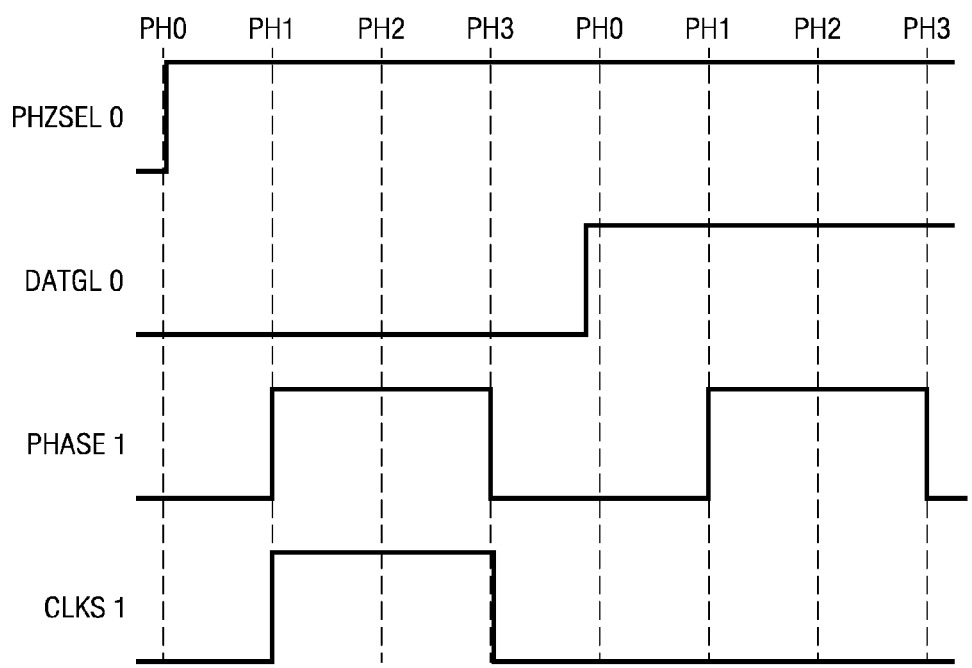
FIG. 12 is an exemplary timing diagram illustrating a clock selection component in accordance with an aspect of the present invention.

FIG. 11 is an exemplary timing diagram further illustrating a clock recovery device in accordance with an aspect of the present invention. Here, timings for a phase select, data toggle signal, and a generated clock for one phase of the clock recovery device are shown. Here, the data toggle signal remains low and does not prevent selection of this phase. FIG. 12 is another exemplary timing diagram further illustrating a clock recovery device in accordance with an aspect of the present invention. Once again, timings for a phase select, data toggle signal, and a generated clock for one phase of the clock recovery device are shown. However, in contrast to FIG. 11, the data toggle signal becomes high and does prevent selection of this phase for the clock.

Figure 13A:
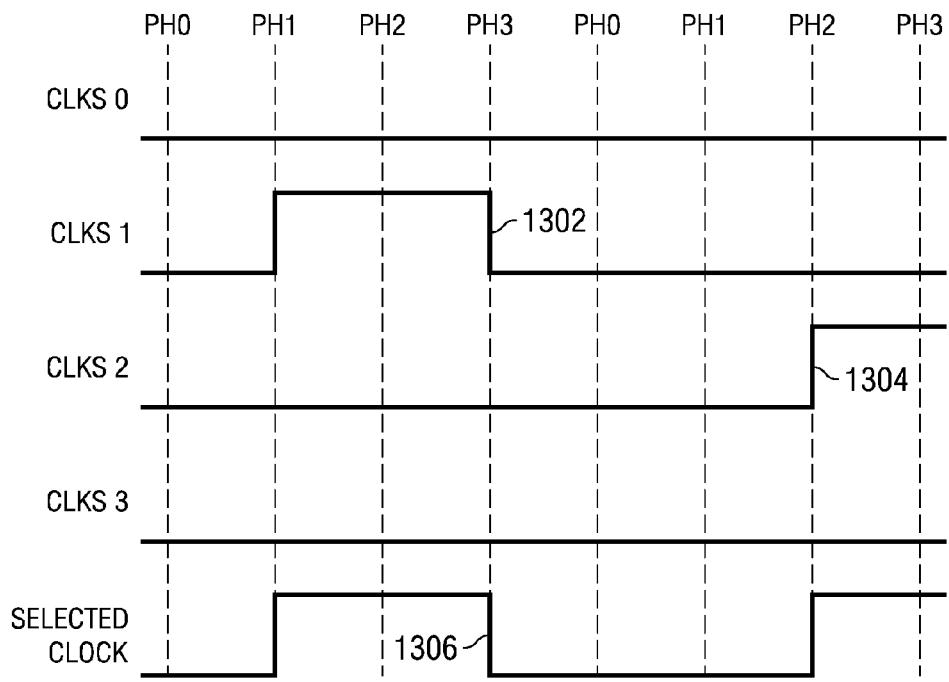
FIG. 13A is an exemplary timing diagram illustrating a clock selection component in accordance with an aspect of the present invention.

FIG. 13A is an exemplary timing diagram illustrating a clock selection component in accordance with an aspect of the present invention. First, second, third, and fourth clocks (CLKS[0], CLKS[1], CLKS[2], and CLKS[3]) are shown as well as a selected clock that is derived there from. Here the first and the fourth clocks remain low through this example. The second clock is high or active at 1302 but becomes low thereafter. The third clock is initially low, but becomes active at 1304. The selected clock, as can be seen at 1306, is a logical OR of the first, second, third, and fourth clocks. As a result, the selected clock 1306 is based on the second clock in a first bit time and the third clock in a subsequent bit time.

Figure 13B:
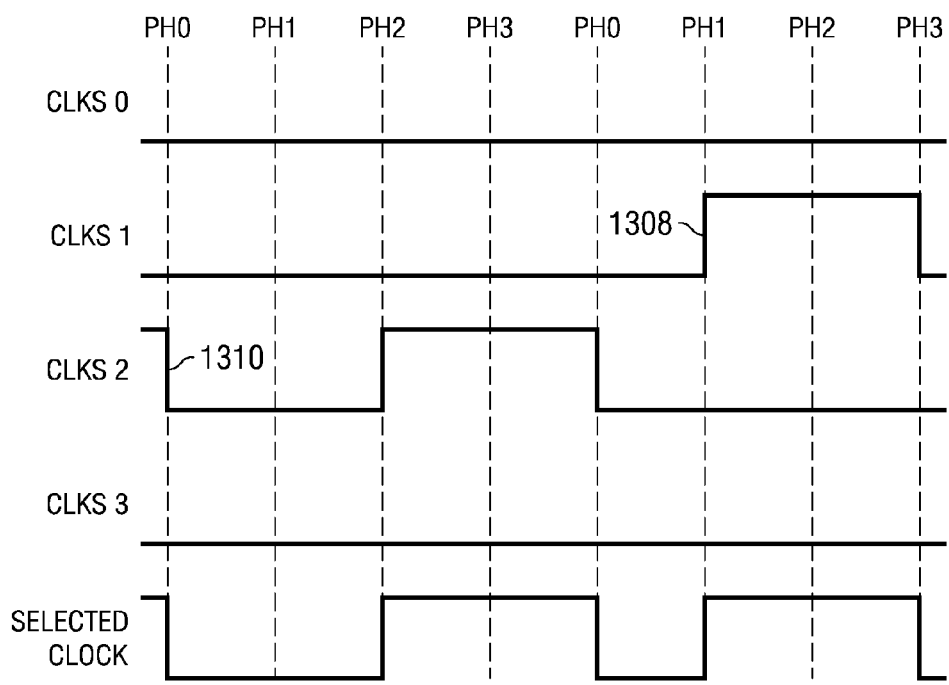
FIG. 13B is an exemplary timing diagram illustrating a clock selection component in accordance with an aspect of the present invention.

FIG. 13B is another exemplary timing diagram illustrating a clock selection component in accordance with an aspect of the present invention. First, second, third, and fourth clocks (CLKS[0], CLKS[1], CLKS[2], and CLKS[3]) are again shown as well as a selected clock that is derived there from. Here the first and the fourth clocks remain low through this example. The second clock is initially low or inactive, but becomes high at 1308 and active for a subsequent bit time. The third clock is initially active (e.g., employed as the selected clock) for a first bit time, but becomes inactive and low at 1310 for a subsequent bit time. The selected clock, as can be seen at 1306, is a logical OR of the first, second, third, and fourth clocks. As a result, the selected clock 1306 is based on the third clock in a first bit time and the second clock in a subsequent bit time.

Figure 14:
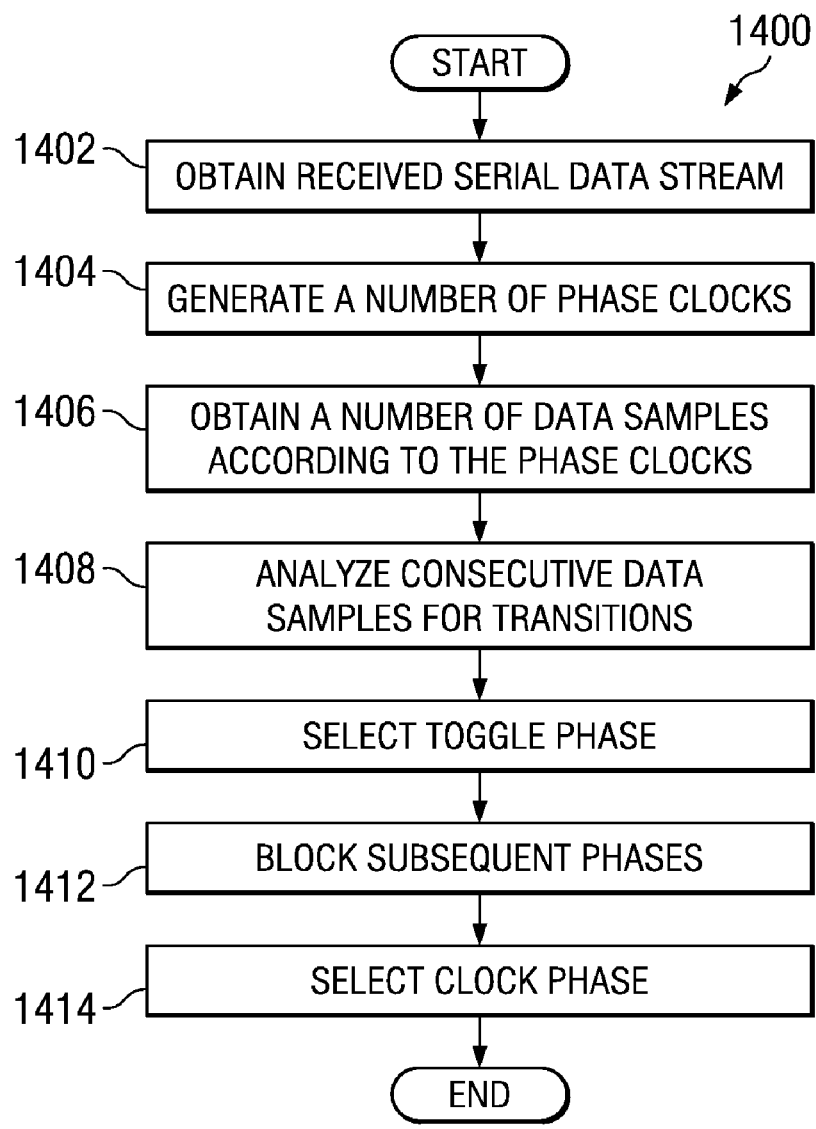
FIG. 14 is a flow diagram illustrating a method of selecting a clock phase from a received NRZI serial encoded data stream in accordance with an aspect of the present invention.

In view of the foregoing structural and functional features described supra, methodologies in accordance with various aspects of the present invention will be better appreciated with reference to the above figures. While, for purposes of simplicity of explanation, the methodology of FIG. 14 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 14 is a flow diagram illustrating a method 1400 of recovering clock information in accordance with an aspect of the present invention. The method recovers clock information from a received data stream while preventing or blocking one phase from being erroneously selected.

The method 1400 begins at block 1402 wherein a received serial data stream is obtained. The received data stream has a known frequency but its phase is not known. The received data stream may have substantial jitter and/or other unwanted signal components. A number of phase clocks are generated at block 1404 according to the standard frequency. The phase clocks are equally spaced throughout a single time period or bit time. A number of data samples are obtained according to the number of phase clocks at block 1406. Thus, a data sample is obtained at each phase. The minimum number of data samples and phase clocks generated depends on jitter. The maximum additionally depends on a number of factors including, but not limited to, data rate, method employed for phase generation, and process technology.

Consecutive data samples are analyzed to identify transitions or data toggles at block 1408. The consecutive samples are analyzed within a clock cycle or bit time. Generally, a transition from low-to-high or from high-to-low is sought to indicate a transition. A first occurrence of a transition or data toggle is selected as a toggle phase at block 1410. One subsequent phase is blocked at block 1412 thereby mitigating inappropriate continued selection of a prior clock phase. However, it is appreciated that more than one subsequent phase can be blocked in alternate aspects of the present invention. Finally, a clock phase is selected at a suitable delay (e.g., half a bit time) from the toggle phase at block 1414. A different delay can be used as long as it still falls between shortest and longest jittered bit times, but the half bit time delay is operable to fulfill this restriction.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A clock recovery device comprising:
   a number of sample components that obtain samples of a received Non-Return-to-Zero Inverted (NRZI) encoded serial data stream at a number of phases, respectively, wherein the number of phases are successively offset throughout a bit time period and the samples are obtained throughout the time period at the number of phases;
   a number of transition detectors corresponding to the number of obtained samples that analyze consecutive data samples in order to identify transitions;
   a continuously operating blocking component that selectively blocks clock phases which were selected for a prior transition that would erroneously contribute to a final recovered clock if not blocked, while allowing clock phases which were selected for a prior transition and that do not erroneously contribute to the final recovered clock, and
   a select clock component that selects a clock phase according to a data toggle phase and generates a selected clock.

2. The device of claim 1, wherein the sample components are comprised of D-type flip flops respectively clocked at one of the number of phases.

3. The device of claim 1, wherein the number of obtained samples is 16.

4. The device of claim 1, wherein the number of sample components are arranged in a dual column configuration to mitigate metastability.

5. The device of claim 1, wherein the transition detectors comprise an XOR logic that generates a low value on a non-occurrence of a transition between two associated successive samples and generates a high value on an occurrence of a transition between two associated successive samples and a register that maintains the generated value.

6. The device of claim 1, wherein the transition detectors generate data toggles that indicate occurrence or non-occurrence of a transition for respective time periods.

7. The device of claim 1, wherein the blocked clock phase is n+1, where n is a current phase with its data toggle set or high.

8. A clock and data recovery system comprising: a receiver that receives an Non-Return-to-Zero Inverted (NRZI) encoded serial data stream having an associated frequency;
   a phase generator that produces N phases of a clock signal that has an associated frequency of approximately the same frequency of the received serial data stream, wherein the N phases are successively offset by (1/N) of a time period; and
   a clock recovery component that identifies transitions in the received serial data stream, selects a clock phase from a first identified transition of a bit time, blocks one other stale selected clock phase, and selects an appropriate clock accordingly.

9. The system of claim 8, further comprising:
   a data recovery component that identifies transitions in the received serial data stream and obtains a recovered serial data stream based solely on the identified transitions.

10. The system of claim 8, wherein the N phases are evenly spaced.

11. The system of claim 8, wherein N is equal to 8, 10, 11, 12 or 16 and the time period is equal to about 2.08333 ns.

12. The system of claim 8, where the minimum value for N is set based on jitter, such that $N>2/(1-(2* jitter\_ratio))$ wherein the jitter_ratio is jitter rate expressed as a fraction.

13. The system of claim 12, wherein the jitter is an estimated value.

14. A clock recovery system comprising:
   a number of phase components that respectively obtain data samples of an Non-Return-to-Zero Inverted (NRZI) encoded serial data stream, identify transitions, set a toggle bit per transition, select a clock phase based on a prior phase toggle setting, use the preceding toggle to block the current clock phase, and generate a clock; and a clock selector that generates a recovered clock from the clocks generated by the number of phase components.

15. The system of claim 14, wherein the respective phase components use a data toggle to block a stale clock phase selection.

16. The system of claim 15, wherein jitter causes a toggle bit for a new transition to set one phase before the now-stale clock phase selected for the prior transition.

17. The system of claim 14, wherein the clock selector obtains the recovered clock by a logical OR of the respective clocks generated by the number of phase components.

18. A method of recovering data over a single time period comprising:

obtaining a number of data samples of a received Non-Return-to-Zero Inverted (NRZI) encoded serial data stream according to a number of phase clocks;

analyzing consecutive data samples to identify transitions;

setting a toggle phase according to a first identified transition of a current bit time;

blocking one subsequent phase from being selected as a clock; and selecting a clock phase according to the toggle phase.

19. The method of claim 18, further comprising generating a number of phase clocks successively and evenly offset throughout a time period.

20. The method of claim 18, wherein analyzing consecutive samples comprises performing an exclusive-or operation on the consecutive samples.

21. The method of claim 18, wherein the subsequent phase to be blocked immediately follows the phase on which the toggle was set for the new transition.

22. The method of claim 18, wherein the clock phase is selected to be N/2 phases after the toggle phase, where N is the total number of data samples.

23. The method of claim 18, wherein the clock phase is selected to be a number of phases after the toggle phase such that the selected phase always falls between earliest and latest expected toggles.

* * * * *